Sept. 5, 1967   R. E. OBENHAUS   3,340,490

THERMISTOR

Filed Oct. 21, 1965

Robert E. Obenhaus,
Inventor.
Koenig, Senniger, Powers and Leavitt,
Attorneys.

3,340,490
THERMISTOR
Robert E. Obenhaus, South Easton, Mass., assignor to Texas Instruments Incorporated, Dallas, Tex., a corporation of Delaware
Filed Oct. 21, 1965, Ser. No. 499,983
7 Claims. (Cl. 338—22)

ABSTRACT OF THE DISCLOSURE

A thermistor is disclosed which is adapted for sensing the temperature of a motor winding. The body of the thermistor includes grooves or channels extending along opposite sides thereof for receiving substantially parallel conductors in the motor winding. The portion of the thermistor body between the grooves is thus somewhat restricted and is subjected to rapid heating by the winding conductors. Sensing leads are attached to the thermistor body on opposite sides of the restricted zone and thus the resistance between the leads follows the winding temperature without an appreciable time lag.

---

This invention relates to thermistors and more particularly to a thermistor having a configuration which enables it to respond rapidly to heating of an electrical winding within which it is embedded.

In providing thermal protection for electric motors it is highly important to have the sensing device respond quickly to changes in winding temperature so that when the motor is rapidly overheating, as under locked rotor conditions, deenergization will be effected before damaging temperatures are reached. Thermistors have been employed previously as sensing elements for motor protection. However, some methods of using thermistors have involved thermistors of large thermal mass which gave a very slow response. Other methods have attempted to obtain a more rapid response by having one of the winding wires pass through an opening in the thermistor but this has typically required that the wire be cut and then spliced which greatly increased the cost of installation. If the thermistor is not in close heat-exchange relationship with the windings, there will be a lag between the actual winding temperature and the temperature to which the sensing element is responding. Typically, the dangers incurred by this lag have been offset by providing an increased margin between the trip temperature and the actually damaging temperature or by including some sort of heat anticipating provision.

Among the several objects of the invention may be noted the provision of a thermistor for sensing the temperature of an electrical winding; the provision of such a thermistor which provides a close thermal coupling between the winding and the temperature responsive material; the provision of such a thermistor which is easily installed in the windings of induction apparatus; the provision of such a thermistor which is reliable and which yields reproducible results; and the provision of such a thermistor which is of simple and inexpensive construction. Other objects and features will be in part apparent and in part pointed out hereinafter.

Briefly, a thermistor according to the invention includes a body of a solid state material having an electrical resistance which varies with temperature. The configuration of the body includes a pair of parallel elongate channels, each channel being adapted to receive one of a pair of adjacent conductors in an electrical winding. A pair of conductive leads are provided in electrical contact with the body, there being a resistive path through the body which connects the leads. The path passes through a portion of the body which is in close heat-exchange relationship with the surfaces of both the channels whereby heating of the winding produces a corresponding change in the resistance between the leads without an appreciable time lag. Preferably, the leads are connected to the body on opposing sides of that portion of the body which lies between the two channels so that current flowing between the leads must pass through the region of the body which is most rapidly heated by dissipation in the winding.

The invention accordingly comprises the constructions hereinafter described, the scope of the invention being indicated in the following claims.

In the accompanying drawings in which several of various possible embodiments of the invention are illustrated;

Corresponding reference characters indicate corresponding parts throughout the several views of the drawings.

Figure 1:
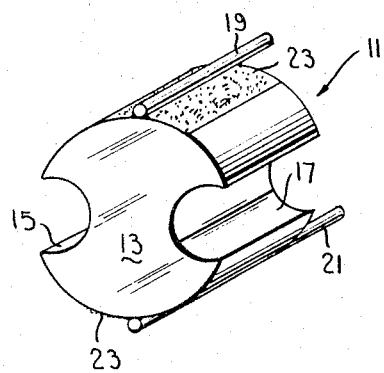
FIG. 1 is a perspective view of a thermistor of the present invention adapted to be embedded in an electrical winding.

Referring now to FIG. 1, there is shown a thermistor 11 including a body 13 of a solid state material having an electrical resistance which varies with temperature. A suitable material is sintered barium titanate. This material has a positive temperature coefficient of resistivity having a very nonlinear characteristic, that is, there exists a relatively sharply defined threshold temperature above which the resistance of the material increases abruptly. Body 13 is of generally cylindrical shape except for a pair of parallel elongate channels 15 and 17 which extend axially of the cylinder on opposite sides thereof forming a restricted zone therebetween. Each of the channels 15 and 17 is adapted to receive a motor winding conductor and thereby bring the conductor into close heat-exchange relationship with the body 13. Body 13 is easily embedded in a motor winding by springing apart a pair of adjacent and generally parallel conductors in the winding, inserting body 13 between the conductors and allowing them to spring back into the channels 15 and 17.

A pair of conductive leads 19 and 21 are electrically connected to body 13 along its length by soldering, as indicated at 23, the areas of contact between the leads and body 13 being spaced from and extending generally parallel to the channels 15 and 17 on opposite sides of the restricted zone. Electric current can flow between the leads along a restrictive path which passes through body 13 and, more particularly, through the restricted zone portion of the body which lies between the channels 15 and 17. This portion of body 13 is in close heat-exchange relationship with the surfaces of both of those channels. Accordingly, it can be seen that heating of winding conductors which pass through channels 15 and 17 produces a corresponding increase in the resistance present between leads 19 and 21 without an appreciable time lag.

It should be noted that all of the current flowing between leads 19 and 21 must pass through the portion of body 13 which lies between the channels 15 and 17 and that there are no paths which avoid this region. Thus, as this region is heated, there are no cooler, low-resistance paths which would shunt and thus nullify the increase in resistance of that portion of the material which is most rapidly heated.

Figure 2:
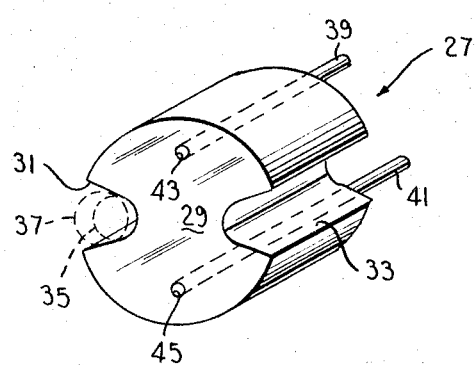
FIG. 2 is a perspective view of another embodiment of a thermistor of this invention, which embodiment is adapted to accommodate winding conductors of different diameters.

In FIG. 2 there is shown a thermistor 27 which includes a body of solid state thermistor material 29 having a pair of axial channels 31 and 33 which are of generally parabolic cross-section. Such a cross-sectional shape allows the channel to receive winding conductors which are of different diameters. The fitting of two different diameters into groove 31 is illustrated by the broken circles 35 and 37. Within a predetermined range, conductors of different sizes will be brought into good thermal contact with body 29 along at least two lines of contact extending the length of the body due to the wedge-like shape of the channels 31 and 33. The use of channels of this shape thus greatly increases the usefulness of a given size of thermistor. For example, more than one wire size may be encountered in a single motor, e.g., different wire sizes being used for the separate start and run windings of a single-phase induction motor. The ability of the channels 31 and 33 to accommodate different conductor sizes also reduces the criticality of the thermistor dimensions which are subject to shrinkage upon sintering of the solid state material.

A pair of leads 39 and 41 are provided in electrical contact with body 29. These leads are soldered into apertures 43 and 45. Apertures 43 and 45 are on opposite sides of the portion of the body lying between the channels 31 and 33 and are equidistantly spaced from the channels. The leads and the channels are essentially thus disposed at the corners of a square lying in a plane which is perpendicular to the channels.

Figure 3:
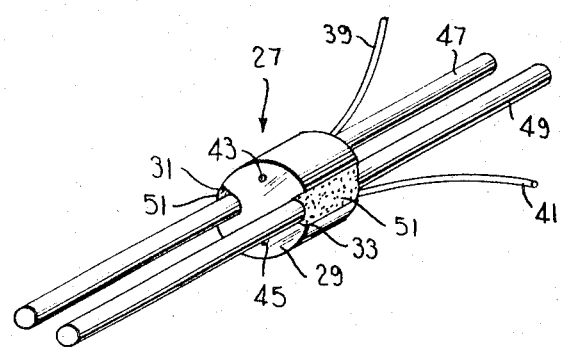
FIG. 3 is a perspective view showing the thermistor of FIG. 2 applied to a pair of winding conductors.

FIG. 3 illustrates the application of thermistor 27 to a pair of motor winding conductors 47 and 49. To apply the thermistor, conductors 47 and 49 are sprung apart, the thermistor 27 is inserted between the conductors and the conductors are then allowed to spring back into the channels 31 and 33. To maintain conductors 47 and 49 securely within channels 31 and 33, the conductors are preferably bonded in position as by an epoxy adhesive, indicated at 51. In addition to holding the conductors in place in the channels, the covering of epoxy also reduces heat loss from the conductors away from body 29.

Figure 4:
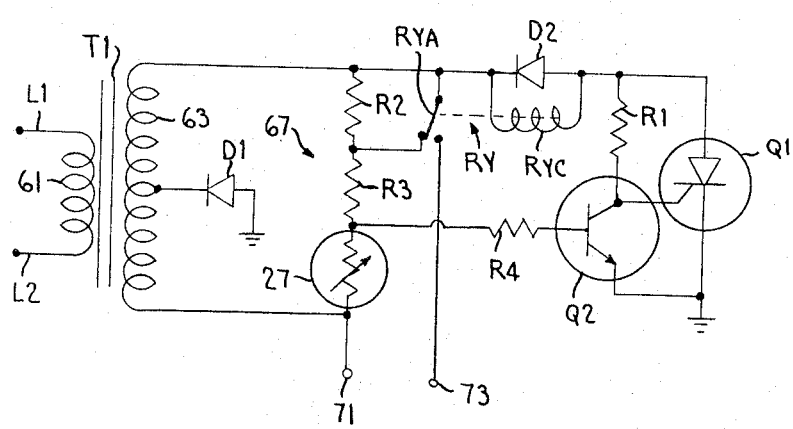
FIG. 4 is a schematic circuit diagram of an overload protector circuit which will deenergize an electrical winding in response to changes in thermistor resistance.

FIG. 4 illustrates overload protection apparatus which is responsive to the resistance of a thermistor embedded in a motor's winding for deenergizing the motor if it should overheat. A.C. power for energizing the protective apparatus is obtained through a pair of leads L1 and L2 from a suitable source or supply means (not shown). Leads L1 and L2 are connected to the primary winding 61 of a transformer T1 which also includes a center-tapped secondary winding 63. The secondary center tap is connected to ground through a diode D1.

The coil RYC of a relay RY is connected between one side of secondary winding 63 and ground through a circuit which includes the anode-cathode circuit of an SCR (silicon controlled rectifier) Q1. A diode D2 shunts coil RYC in a conventional manner for the purpose of eliminating chatter on alternate A.C. half cycles when the SCR Q1 is reversed biased. Triggering current is provided to the SCR Q1 through a resistor R1 which extends from the SCR's anode terminal to its gate terminal. The gate-cathode circuit of SCR Q1 is shunted by the collector-emitter output circuit of a transistor Q2.

Connected across the entire secondary winding 63 is a voltage divider 67 which includes a pair of resistors R2 and R3 and the thermistor 27. Resistor R2 is selectively shunted by the normally closed side of a set of contacts RYA which are operated by the relay coil RYC. The junction between resistor R3 and thermistor 27 is connected, through a current limiting resistor R4, to the base terminal of transistor Q2.

A pair of terminals 71 and 73 are provided for connection to a motor contactor which, when energized, applies power to and energizes the electric motor being protected. Terminal 71 is connected to one side of secondary 63 and the other terminal 73 is selectively connected to the other side of the secondary winding 63 by means of the normally open side of contacts RYA.

The operation of this circuit is as follows, only those A.C. half cycles during which SCR Q1 is forward biased being considered. When the motor winding is relatively cool, thermistor 27 exhibits a relatively low resistance. The voltage divider 67 will thus reverse bias the base-emitter junction of transistor Q1 thereby cutting off conduction in the emitter-collector output circuit. Current flowing through resistor R1 thus triggers SCR Q1 which in turn energizes the relay RY. Energization of relay RY closes the normally open side of contacts RYA and the motor contactor is thus actuated to energize the motor. Accordingly, it can be seen that, when the motor windings are cool, power can be applied to the motor.

If, however, the motor overheats so that the resistance of thermistor 27 becomes relatively large in relation to the resistance provided by the resistors R2 and R3, transistor Q2 is forward biased and its emitter-collector output circuit shunts the current flowing through resistor R1 away from the gate electrode of SCR Q1. Relay RY is then released and the motor contactor is deenergized so that power is withdrawn from the motor and its heating is stopped.

Simultaneously with the deenergization of the motor contactor, contacts RYA shunt resistor R2. The shunting of this resistor shifts the balance of voltage divider 67 and provides a differential in the operation of the protector circuit. Accordingly the thermistor 27 must cool down to a temperature appreciably below the temperature at which deenergization of the motor was effected before the motor can again be reenergized. It is noted that this circuit provides substantial power gain by virtue of the characteristics of the transistor Q2, the SCR Q1 and the relay RY. Thus, the thermistor 27 itself does not have to dissipate any substantial power and can be of quite low thermal mass without incurring any appreciable self-heating which would reduce the accuracy of its temperature sensing function. By employing the configuration of the present invention, a thermistor of such low thermal mass can be very closely coupled to an electric winding so that it will respond extremely rapidly to changes in the winding temperature. Thus, exceptionally effective thermal protection can be provided.

While a PTC thermistor material has been described by way of example, NTC material may also be used and modifications of the control circuit shown to accommodate such NTC thermistors will be apparent to those skilled in the art. Similarly, while the thermistors shown have been of generally cylindrical overall configuration, various other external configurations may be used to further facilitate the embedding of the thermistor within a winding. Also more than one thermistor may be used in a given winding to sense the temperature at more than one location. Overload protection circuits which are responsive to a plurality of sensors are shown and claimed in my copending, coassigned application Ser. No. 430,006, filed Feb. 3, 1965, for Control Apparatus.

In view of the above it will be seen that the several objects of the invention are achieved and other advantageous results attained.

As various changes could be made in the above constructions without departing from the scope of the invention, it is intended that all matter contained in the above description or shown in the accompayning drawings shall be interpreted as illustrative and not in a limiting sense.

What is claimed is:

1. A thermistor for sensing the temperature of an electrical winding, said thermistor comprising:
   a body of a solid state material having an electrical resistance which varies with temperature, said body having a pair of parallel elongate channels therein which extend along substantially opposite sides of said body thereby defining a restricted zone therebetween, which zone is in close heat-exchange relationship with the surfaces of both of said channels, each of said channels being adapted to receive a respective one of a pair of adjacent conductors in said winding; and a pair of conductive leads in electrical contact with said body at respective points which are spaced from said channels and are on opposite sides of said restricted zone thereby providing a resistive path through said zone connecting said leads, whereby heating of said winding produces a corresponding change in the resistance between said leads without an appreciable time lag.

2. A thermistor as set forth in claim 1 wherein the area of contact between each of said leads and said body is elongate and extends generally parallel to said channels.

3. A thermistor as set forth in claim 1 wherein said material has a positive temperature coefficient of resistivity whereby dissipation of heat from said winding conductors disposed in said channels raises the resistance of said zone.

4. A thermistor as set forth in claim 1 wherein said leads are embedded in and extend through said body substantially parallel to said channels, said leads being on opposite sides of said zone with each lead being substantially equally spaced from the two said channels.

5. A thermistor as set forth in claim 1 wherein said leads extend through said body substantially parallel to said channels and wherein said leads and said channels are disposed substantially at the corners of a square lying in a plane which is perpendicular to said channels.

6. A thermistor as set forth in claim 1 wherein said channels are of substantially parabolic shape in cross section thereby to accommodate a range of winding conductor sizes while providing at least two lines of contact between said body and each said conductor thereby to obtain a close thermal coupling between said body and said winding.

7. A thermistor as set forth in claim 6 wherein said body apart from said channels is of substantially cylindrical shape.

References Cited

UNITED STATES PATENTS

| | | | |
|---|---|---|---|
| 2,373,160 | 4/1945 | Bollman et al. | 338—22 |
| 2,937,354 | 5/1960 | Mazzarella et al. | 338—22 |
| 2,989,713 | 6/1961 | Warner | 338—22 |
| 3,061,739 | 10/1962 | Stone et al. | 338—22 |
| 3,175,177 | 3/1965 | Gaugler | 338—28 |
| 3,197,725 | 7/1965 | Sapoff et al. | 338—22 |
| 3,214,719 | 10/1965 | Turner | 338—22 |
| 3,262,014 | 7/1966 | Conner | 317—13 |

RICHARD M. WOOD, *Primary Examiner.*

W. D. BROOKS, *Assistant Examiner.*